United States Patent [19]

Brown

[11] 4,290,507

[45] Sep. 22, 1981

[54] ACTUATING SYSTEM AND APPARATUS FOR BRAKES AND CLUTCHES AND THE LIKE

[76] Inventor: Lawrence G. Brown, 1629 Kuhilani St., Honolulu, Hi. 96821

[21] Appl. No.: 47,762

[22] Filed: Jun. 12, 1979

Related U.S. Application Data

[63] Continuation-in-part of Ser. No. 878,028, Feb. 15, 1978, abandoned.

[51] Int. Cl.³ .............................................. B62L 3/00
[52] U.S. Cl. .................................... 188/24.15; 74/97; 188/72.3; 188/72.6; 188/72.7; 188/72.9; 188/167; 192/70.24
[58] Field of Search ..................... 188/24, 25, 26, 27, 188/59, 72.7, 72.9, 72.6, 166, 167, 72.3; 74/97; 192/70.23, 70.24, 70.29, 70.3, 93 R

[56] References Cited

U.S. PATENT DOCUMENTS

| | | | |
|---|---|---|---|
| 2,389,962 | 11/1945 | Dougherty | 60/594 X |
| 2,564,137 | 8/1951 | Wahlberg | 60/594 X |
| 2,621,523 | 12/1952 | Taylor | 192/93 R X |
| 3,533,494 | 10/1970 | Spokes et al. | 192/70.29 X |
| 3,628,635 | 12/1971 | Yoshigai | 188/24 X |
| 3,680,663 | 8/1972 | Kine | 188/24 |
| 4,026,392 | 5/1977 | Hirschkoff | 74/97 |

FOREIGN PATENT DOCUMENTS

929398  7/1947  France .................................. 188/24

Primary Examiner—George E. A. Halvosa
Attorney, Agent, or Firm—Bruce G. Klaas

[57] ABSTRACT

Actuating apparatus for actuating a device such as a brake or clutch or the like comprising output force transfer apparatus movable between an open non-force applying position and closed force applying positions whereat a variable output force is applied to the device in the closed force applying positions; and wherein the actuating apparatus causes, movement of the output force transfer apparatus between the open position and the closed positions and exerts variably increasable output forces in the closed positions. A constant force applying apparatus continuously exerts a uniform substantially constant force of pre-selected magnitude on the output force transfer apparatus in the closed positions and holds the output force transfer apparatus in the open position. A cam apparatus changes the point of application of force from the constant force applying apparatus to the output force transfer apparatus and varies the amount of output force exerted by the output force transfer apparatus while external force application apparatus actuates the cam apparatus; and force limiting apparatus limits the maximum amount of the output force applicable to the device.

11 Claims, 10 Drawing Figures

ACTUATING SYSTEM AND APPARATUS FOR BRAKES AND CLUTCHES AND THE LIKE

This application is a continuation in part of my prior U.S. patent application Ser. No. 878,028 filed Feb. 15, 1978, now abandoned the benefit of the filing date of which is claimed herein.

BACKGROUND AND SUMMARY OF THE INVENTION

The present invention relates generally to actuating apparatus for brake or clutch systems or the like and, more particularly, to bicycle brake systems and apparatus.

Among the advantages and objects of the present invention are the following:

(1) The provision of actuating apparatus utilizing a substantially constant force applying means for continuously exerting a uniform substantially constant force of pre-selected magnitude associated with force multiplying means movable between variable output force applying positions by relatively low input force against relatively low resistance.

(2) The use of such actuating apparatus in association with bicycle brakes to: (a) provide power assist means by which safe braking of bicycles may be accomplished without dependence on the ability of the bike rider to exert sufficient braking force while lessening the amount of force required by any bike rider; (b) enable variable control of braking force in accordance with varying force applying characteristics of various bicycle riders; and (c) to enable control of braking force to prevent pitch over.

(3) The use of such apparatus in association with automotive brake systems to: (a) provide new and improved power assist means of simplified low cost construction having a minimum number of parts and relatively low cost; (b) to enable application of relatively high braking force against relatively high resistance by application of relatively low input force against relatively low resistance which may be variably increased in proportion to the amount of braking force generated to provide "feel" for the driver; and (c) to enable self adjustment to compensate for wear of parts of the system.

(4) The use of such apparatus in association with a friction clutch system to; (a) enable engagement and disengagement by use of a substantially constant force applied through force multiplication means operable by relative low external force against relatively low system resistance; and (b) apply clutch operating force at relatively low force levels in a slip range while gradually slowly increasing the applied force in the slip range to reach a fully engaged position and then further increasing the applied force in a fully engaged range.

In general, the present invention involves the use of constant force applying means and cam means to provide application of output forces in addition to and independent of manually or otherwise applied input forces while also being constructed and arranged to positively hold the force applying apparatus in an open non-force applying position. In addition, the construction and arrangement is such as to provide maximum force limiting means which preclude the application of forces of a magnitude likely to result in adverse consequences of overloading of the actuated apparatus such as pitch over in a bicycle brake system or gear wear in a clutch system. The system and apparatus is such as to enable versatility in design to accommodate particular variable parameters and to enable adjustment of design characteristics to accommodate such variable parameters as necessary or desirable.

BRIEF DESCRIPTION OF DRAWING

Illustrative and presently preferred embodiments of the inventive concepts are shown in the accompanying drawing in which.

DETAILED DESCRIPTION

Figure 1:
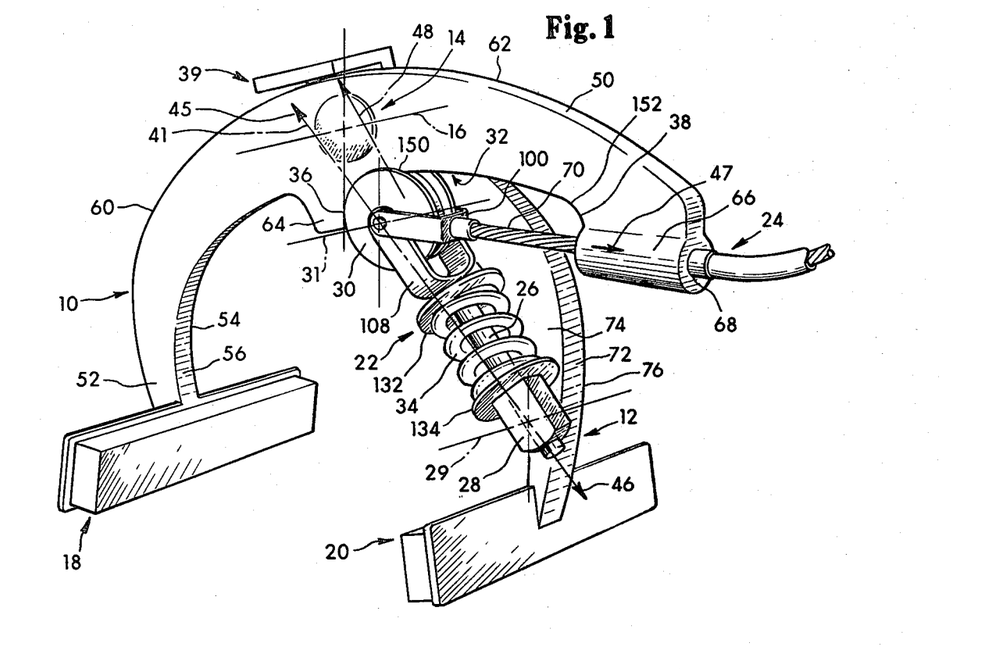
FIG. 1 is a schematic illustrative perspective view of a caliper-type bicycle brake apparatus in an open non-braking position.
Figure 2:
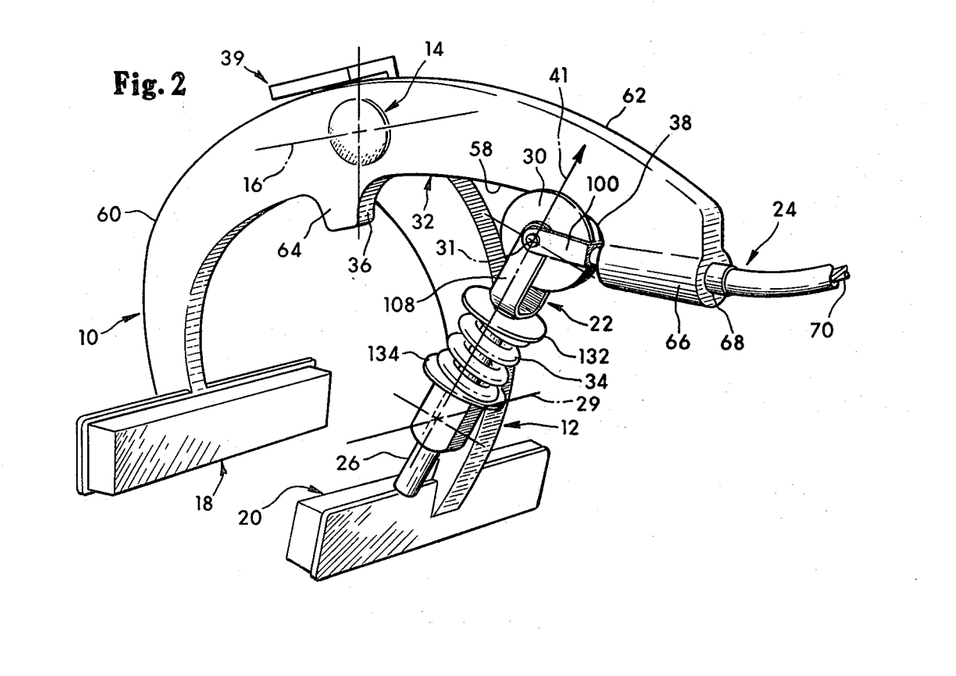
FIG. 2 is another schematic illustrative view of the brake apparatus in a closed braking position whereat maximum braking force is applied.

The presently preferred and illustrative caliper bicycle brake system of FIGS. 1-4 comprises a pair of lever arm means 10, 12 with pivotal connecting means 14, adapted to be suitably mounted on a portion 15 of the frame of a bicycle and providing a pivotal axis 16, for enabling pivotal movement of the arm means relative to one another and to a bicycle wheel rim (not shown) between an open non-braking position, FIG. 1, and a closed braking position, FIG. 2, and between minimum and maximum brake force applying portions in the closed braking position. Brake pad means 18, 20 are mounted in opposed oppositely facing relationship on the lower end of each of the arm means for braking engagement with the wheel rim in the closed braking position. Brake actuating means 22 are operatively associated with the arm means to cause pivotal movement thereof between the open non-braking position with the pad means spaced from the wheel rim and a closed braking position with the pad means engaging the wheel rim, and thereafter to cause further pivotal movement thereof between the initial minimum braking force application position and the maximum braking force application position. The brake actuating means is operable by an external force application control means 24 in the form of a conventional Bowden wire assembly manually operable by a control lever (not shown). The brake actuating means comprises a slidable lever rod means 26 slidably mounted in a rod mounting block means 28 pivotally connected to the arm means 12 about a pivot axis 29; a roller means 30 mounted on the rod means 26 for rotation about a rotational axis 31 parallel to axis 16 and axis 29 and being engageable with the movable along cam and force reaction surface means 32 on one end of the other arm means 10; and a spring means 34 operatively associated with the rod means and the roller means in a pre-stressed condition providing a predetermined spring face for continuously biasing the roller means against the cam surface means 32. Roller stop means 36, 38 are provided at opposite ends of the surface means 32 for locating the roller means in the open non-braking position and in a maximum brake force applying position. A suitable arm stop means 39 having stop surfaces 40, 42 is suitably fixedly mounted relative to the bicycle frame means 15 for locating the arm means in the open non-braking position.

The construction and arrangement is such that, in the open non-braking position, the longitudinal axis 41 of the rod means and the pivotal axes 29, 31 are located in a plane extending at a slight angle to a center plane including pivotal axes 16, 29 so that the spring means 34 exerts a predetermined relatively hold open force in the direction of arrow 45, against the roller means to maintain the one arm means 10 in the open position while also exerting an equal and opposite force against the rod mounting block means 28 in the direction of arrow 46 to also maintain the other arm means 12 in the open position. When a sufficient minimum brake actuating force is applied to the roller means in the direction of the arrow 47 through the cable means, the roller means and rod means are pulled about pivotal axis 29 from the over center open nonbraking position of FIG. 1 to an opposite over center closed braking position indicated by center line 48 relative to the center plane of pivotal axes 16, 29 whereat the force of the spring means is effective to cause equal opposite pivotal displacement of the arm means from the open non-braking position to the closed braking position. Thereafter, further radially outward pivotal movement of the roller means and the rod means relative to the pivotal axis of the arm means, caused by actuating force applied through the cable means, causes further pivotal movement of the arm means resulting in application of proportionally increased uniform braking force through the pad means. The amount of braking force thus applied can be controlled by the configuration of the cam surface means on the arm means 10 and the maximum amount of braking force can be limited by the location of stop means 38 to limit the maximum outward movement of the roller means along the cam surface means. Furthermore, the construction and arrangement of the spring means and the cam surface means may be correlated to provide additional power assist return means for fast positive return of the lever arm means from the maximum force closed braking position toward the open non-braking position by increasing the applied spring force during the movement in the closed braking position from the initial minimum applied braking force position toward the maximum applied braking force position.

The lever arm means 10 may comprise an elongated curved metallic bar member having generally rectangular variable cross-sectional configurations defined by an upper curved surface 50, parallel flat side surfaces 52, 54 and lower surfaces 56, 58, the surface 58 providing the cam surface means 32. A pad mounting arm portion 60 is provided on one side of the pivotal axis 16 and a lever arm position 62 is provided on the other side. A depending lug portion 64 provides the stop means 36. A bore 65 extends along axis 16 to receive the pivotal connecting means 14. A cable mounting hub portion 66 having a mounting bore 68 is provided on the outer end of lever arm portion 62 to mount the cable means 24 and slidably hold the cable wire member 70.

The lever arm means 12 may comprise an elongated curved metallic bar member having generally rectangular variable cross-sectional configurations defined by a curved upper surface 72, parallel flat side surfaces 74, 76 and a curved lower surface 78. A bore 79 is provided in an enlarged hub portion 80 at one end of lever member 12 to receive the pivotal connecting means 14 and the pad means 20 is suitably mounted on the other end thereof.

Figure 3:
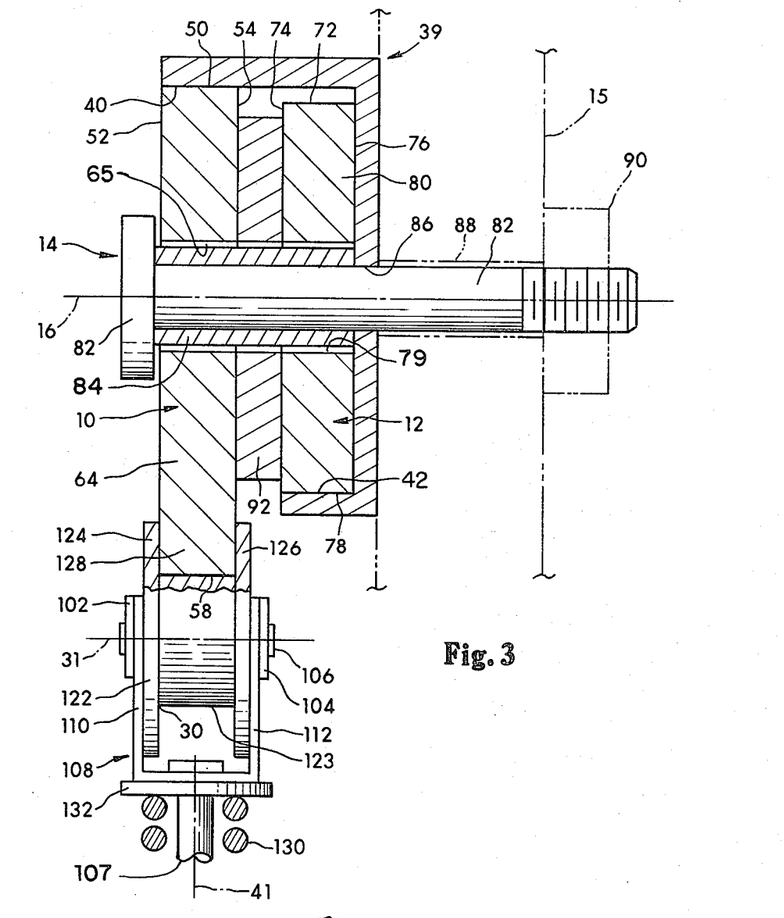
FIG. 3 is an enlarged illustrative partial cross-sectional view taken through the central axis of the pivotal connecting means for the lever arm means of the apparatus of FIG. 1.

The pivotal connecting means 14 may comprise a mounting bolt member 82 extending through a bearing sleeve member 84 mounted in the aligned bores 65, 79 in the lever arm means 10, 12; through a bore 86 in the stop means 39; and through a bore 88 in a portion of the frame or fork means 15 of a bicycle. The bolt member may be fastened thereon by suitable fastening means such as a threaded end portion of the bolt member and a threaded locking nut 90. In order to provide sufficient clearance for the brake actuating means, a spacer member 92 or the like may be provided between the lever arm members 10, 12.

The wire member 70 of the external force application means 24 is connected to the slidable rod means 26 and roller means 30 by a clevis member 100 having leg portions 102, 104 pivotally mounted on a roller pin member 106.

The rod means 26 comprises a rod member 107 with the upper end portion connected to the external force applying means 24 and the roller means 30 by a clevis member 108 having leg portions 110, 112 pivotally mounted on roller pin member 106.

Figure 4:
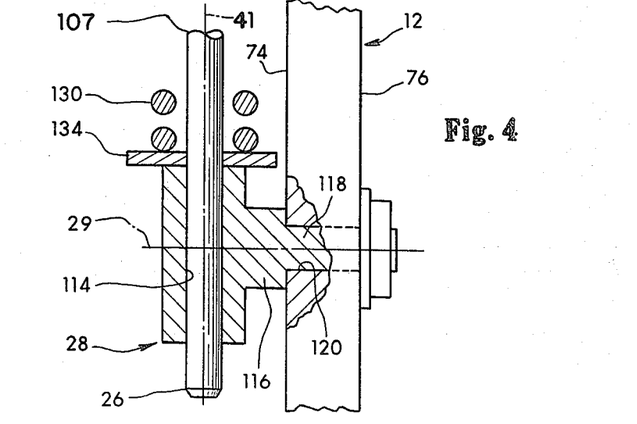
FIG. 4 is an enlarged illustrative partial cross-sectional view of the pivotal connecting means between the brake actuator means and one of the lever arm means of the apparatus of FIG. 1.

The connecting block means 28 has a bore 114 to slidably receive and support the lower end of the rod member 107. Suitable pivotal connecting means, in the form of a laterally extending spacer portion 116 and a pin portion 118 pivotally mounted in a bore 120 in lever arm member 12, pivotally connectably support the connecting block means 28 on lever arm member 12.

The roller means 30 comprises a roller member 122 having a hub portion 123 and spaced flange portions 124, 126 between which the lower portion 128 of the lever arm portion 64 of the lever arm member 10 is received. The construction and arrangement is such as to enable free rotation of the roller means while maintaining the outer peripheral surface of the hub portion 123 in force transfer engagement with the cam surface means 32.

The spring means 34 comprises a compression spring member 130 confined between abutment plate members 132, 134 in a continuously compressed condition causing continuous application of force to roller means 30 in the direction of the cam surface means 32.

In operation, the lever arm means 10, 12 are normally positively held in the open non-braking position by the force of spring means 34 applied to the arm means 10 through roller means 30 in the direction of arrow 45 and to the arm means 12 through connecting block means 28 in the opposite direction of arrow 46 along the axis of rod means 26. The spring force is thus applied to the arm means 10 along a first over center force plane, including the pivotal axes 29, 31 which is over center relative to the central plane including pivotal axes 16, 29. Thus a clockwise rotational force is applied to arm means 10 and an opposite counter clockwise rotational force is applied to arm means 12 as viewed in FIGS. 1 and 2. The engagement of stop surfaces 40, 42 of stop means 39 with the top surface 50 of arm means 10 and the bottom surface 78 of arm means 12 positively locates the arm means in the open position with the brake pad means located in a predetermined outwardly spaced position relative to the bicycle wheel rim.

In order to close the brake, an actuating force is manually applied to wire member 70 in the direction of arrow 47 and that force is transmitted to the rod means 26 through clevis member 100, pin member 106 and clevis member 122. The effective closing force applied to the rod means 26 is a function of the radial distance between axes 29, 31. The wire member 70 or other actuating means may be connected to the rod means 26 at other positions closer to the pivotal axis 29. In the illustrative embodiment, a relatively small applied force on wire member 70 is effective to pivotally displace the rod means 26 from the open position of FIG. 1 to the initial closed position whereat the force application plane including the pivotal axes 29, 31 is located beyond the center plane including pivotal axes 16, 29 as illustrated by center line 48. As soon as the force application plane moves beyond the center plane, the spring force is immediately effected to close the brake and apply an initial minimum braking force of, for example, 2 to 3 pounds. Due to the relatively short distances of travel of the brake parts and the effect of the spring means, the movement from the open position to the closed position is very fast.

In order to increase the applied braking force, the rod means 26 is pulled further outwardly by further movement of the wire member 70 in the direction of arrow 47 by an amount of manually applied force which is a function of the configuration of the cam surface means 32 and the spring force applied by spring means 34. In addition, the amount of the force exerted by the spring means 34 during application of brake force in the closed position is dependent upon the state of compression of the spring means which is dependent upon the radial distance between pivotal axes 29, 31. Thus, the state of compression of the spring means and the amount of spring force can be controlled by the configuration of the cam surface means 32 which determines the radial spacing between axes 29, 31 during outward movement of the rod means 26. If the cam surface means is designed to maintain a constant radial spacing between axes 29, 31, the spring force will be constant and a relatively low actuating force will be effective to apply all braking forces.

If the cam surface means is designed to increase the radial spacing between axes 29, 31, the spring force will be decreased. If the cam surface means is designed to decrease the radial spacing between axes 29, 31, the spring force will be increased. In addition, the cam surface means can be designed to provide any desired combination of constant increased or decreased spring force at any particular position of the rod means. For example, in the illustrative embodiment, the cam surface means 32 is designed to maintain a constant radial distance between axes 29, 31 from the initial minimum applied force position at 150 to a point 152 adjacent the stop means 38 whereat the radial distance is rapidly decreased to compress the spring means 34 whereby, upon removal of the manually applied force on wire member 70, the additional spring force will provide increased power assist return means to rapidly initiate return movement of the brake apparatus toward the open position.

As the rod means 26 is pulled further outwardly by the manually applied force on wire member 70, the force application plane is moved increasingly further distances outwardly from the pivotal axis 16 of the arm means to thereby increase the length of the moment arm and the mechanical advantage of the system resulting in corresponding increases of applied braking force even though the applied spring force remains constant. The maximum amount of applied braking force is positively limited by the stop means 38 which in the illustrative embodiment is located relative to pivotal axis 16 a distance such as to limit the maximum braking force to 150 pounds.

In the illustrative embodiment, with the cam surface means 32 designed to maintain a constant radial distance between axes 29, 31 between points 150, 152, the spring means 34 applies a constant spring force which assists in the application of braking force to the wheel rim through the brake pad means 18, 20 and the magnitude of the applied braking force attributable to the force of the spring means increases in relationship to the increased radial distance between the pivotal axis 16 and the pivotal axis 31. In this manner, power assist means are provided for the brake apparatus in all closed positions and the magnitude of the power assist increases as the radial outward location of the spring force increases. Thus, the amount of manually applied force required on cable 70 in any given position of the rod means and for any given applied braking force is substantially reduced as compared with conventional bicycle braking systems wherein the amount of applied braking force is proportional to the amount of manually applied force.

Another advantage of the present invention involves the capability of varying the conditions of and response to manually applied braking force in accordance with predetermined parameters. For example, the manually applied braking force capabilities of various persons differ substantially depending upon age, strength and physical condition. Thus, in general, men, women, and children have different force applying capabilities as well as different weight characteristics which determine the amount of force required for stopping under any particular conditions. Furthermore, various people within those categories have various strength characteristics depending on physical conditions such as arthritus. Thus, it is contemplated that the present invention may be utilized to provide different braking capability for categories of persons such as men, women and children by providing different spring means for each category and also that the predetermined compression of the spring means may be made adjustable by, for example, providing a threaded adjustment on the rod means 26 associated with one of the abutment means 132, 134. In addition, the maximum applicable brake force may be adjusted by varying the length of the cam surface means 32 and/or the location of stop means 38. For this purpose, an assortment of standard cam surface means designs may be provided each brake apparatus may be provided with adjustment means such as an adjustably movable member at the outer end of the cam surface means, e.g., an adjustable threaded collar mounted in bore 68 and extending radially inwardly toward roller means 30 or various adjustable stops mounted in a plurality of spaced bore in the arm means portion 62 along the cam surface means 32 and associated with the roller means 30 or the rod means 26 or the connecting block means 28 in any suitable manner.

In addition, the illustrative design and arrangement of the actuating force applicator means may be variously otherwise constructed to provide similar advantages and results. For example, it is contemplated that the pivotal rod means 26 and the spring means 34 may be replaced by cantilevered leaf spring means associated with one of the lever arm means and extending outwardly from the pivotal axis 16 with cam surface means on one or the other lever arm means engageable with radially outwardly movable trolley means confined between the lever arm means and engageable with the spring means. Also, it is contemplated that the compression spring means 34 on rod means 26 may be replaced by a bellows-like spring means or by a plurality of spring washers mounted on the rod means. In addition, the power assist return means may be obtained by use of torsion springs mounted on the pivotal connecting means 14 and suitably associated with the lever arm means 10, 12.

Figure 5:
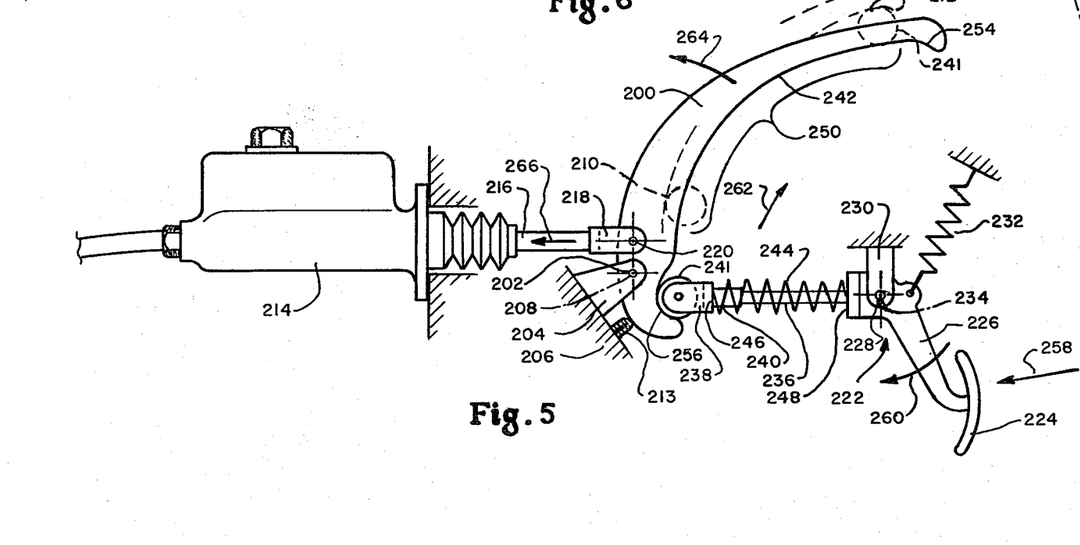
FIG. 5 is a schematic side elevational view of a hydraulic type automotive brake apparatus.

In the automotive brake system embodiment of FIG. 5, a lever arm means 200 is suitably pivotally mounted by pin means 202 on a bracket means 204 suitably fixed to a portion 206 of a vehicle fire wall or floor or the like. Lever arm 200 is pivotally movable about pivotal axis 208 between a non-braking solid line position and variably pivotally displaced braking force applying positions including a minimum force applying position indicated at 210 and a maximum force applying position indicated at 212. An adjustable stop means 213 may be provided to locate the lever arm in the non-braking position. The lever arm is operatively connected to a main cylinder 214 of a conventional automotive hydraulic brake system by a connecting rod means 216, a clevis member 218 and a pivot pin 220.

Brake actuating means 222 are operatively associated with lever arm 200 to cause pivotal movement thereof and comprise a brake pedal 224 mounted on the lower end portion of a brake arm 226 pivotally connected by a pin 228 to a support bracket 230 suitably fixed to the vehicle to enable pivotal downward displacement of the brake arm against the bias of suitable return spring means 232 about pivotal axis 234 which is located below pivotal axis 208. An elongated rod means 236 is suitably attached to brake arm 226 for pivotal upward displacement therewith. A clevis member 238 is axially slidably mounted on the end of rod 236 by a sleeve portion 240 and carries a cam follower roller means 241 continuously biased into engagement with cam surface 242 on arm 200 by spring means 244 mounted circumjacent rod 236 between abutment surfaces 246, 248.

The cam surface 242 comprises an arcuate portion 250 an outwardly curved outermost stop portion 254, and an inwardly curved innermost portion 256 aligned with the roller 241 in the non-actuated position of the brake arm 226 to positively hold the lever arm 200 in the non-actuated position.

In operation, input force is applied on pedal 224 in the direction of arrow 258 which causes pivotal downward movement of brake arm 226 about pivotal axis 228 in the direction of arrow 260 and pivotal upward movement of rod 236 about pivotal axis 234 in the direction of arrow 262. Roller 241 is moved upwardly along cam surface 242 onto arcuate surface portion 250. Roller 241 is maintained in force transfer engagement on surface 242 by the bias of compression spring 244 without any substantial axial displacement of sleeve portion 240 to maintain a substantially constant spring force. When roller 241 is moved beyond the pivotal lever axis 208, it begins to exert an actuating force on the lever arm 200 to cause pivotal displacement thereof in the direction of arrow 264 and linear displacement of connecting rod 216 in the direction of arrow 266 to the brake applying position. Upon application of the brakes, further pivotal movement of lever arm 200 is opposed by the resistance of the brake system 214. As the brake pedal arm is further pivotally downwardly displaced and the rod 236 is correspondingly further upwardly displaced, the point of application of force from the roller 241 to the lever arm 200 is correspondingly radially outwardly displaced relative to lever arm pivotal axis 208 whereby the moment of force is gradually uniformly increased in proportion to the radial outward displacement. The brake actuating input force is supplied by spring means 244 through roller 241 against cam surface 242 and is substantially independent of the amount of external force applied to the foot pedal 224 which is a function of only the amount of resistance to pivotal displacement of brake arm 226 against the bias of the return spring 232 and frictional resistance between roller 241 and cam surface 242. Thus, the amount of applied brake actuating force is a function of the amount of force applied by spring 244 and the location of application of the spring force on lever arm 200. The force of spring 244 and the curvature of cam surface 242 may be modified as necessary or desirable to provide any desired results from any particular system. The spring 244 may be replaced by any other suitable force applying means such as a hydraulic, air or vacuum operated power cylinder or the like as hereinafter described. In addition, the lever arm 200 may be connected to any actuable device other than the main cylinder 214 of a hydraulic brake system. For example, the actuating apparatus of the present invention may be advantageously used with clutch apparatus to cause engagement and disengagement of driving and driven members and to exert force maintaining such engagement.

Figure 6:
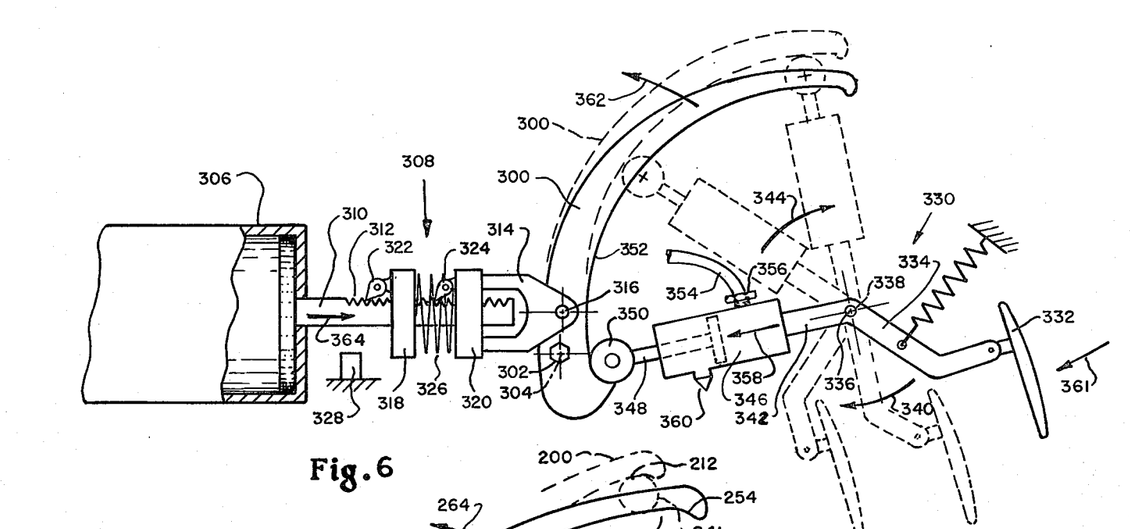
FIG. 6 is a schematic side elevational view of another hydraulic type automotive brake apparatus.

In the automotive brake system embodiment of FIG. 6, a lever arm means 300 is suitably pivotally mounted by a pin means 302 providing a fixed pivotal axis 304 for movement between a non-braking force transfer position and variable radially outwardly displaced braking force applying positions. Lever arm 300 is operatively connected to a main cylinder 306 of a conventional hydraulic automotive brake system by self adjusting connecting means 308 in the form of a piston rod 310 having a toothed surface 312, a clevis member 314 pivotally connected to lever arm 300 by a pivot pin 316, a pair of axially spaced relatively movable ratchet collar members 318, 320 having ratchet members 322, 324 operably engaged with toothed portion 312, a compression spring 326 compressibly mounted circumjacent rod 310 between collars 318, 320 and a stop 328 engageable with collar 318.

Brake actuating means 330 are operatively associated lever arm 300 for applying relatively low external operating force to cause pivotal displacement thereof and apply relatively high substantially constant actuating force to rod 310 therethrough. The actuating means comprises a relatively low force low resistance external input force applying means in the form of a foot operated pedal 332 mounted on a pedal arm 334 pivotally mounted by a suitably mounted pivot pin 336 for pivotal downward movement about pivotal axis 338 in the direction of arrow 340 with an opposite end portion 342 being pivotally upwardly displaceable in the direction of arrow 344. The actuating means further comprises independent relatively high substantially constant force low resistance actuating force applying means in the form of a fluid operable power cylinder 346 mounted on arm portion 342 with a piston rod 348 supporting a cam follower roller member 350 in constant engagement with a cam surface 352 on lever arm 300. The cylinder 346 is connected to a suitable power source, such as the engine of a vehicle, by a fluid line 354 and a check valve 356 to maintain a constant pressure in cylinder 346 providing a predetermined force applicable to rod 348 in the direction of arrow 358. A suitable pressure sensor device 360 may be associated with cylinder 346 to control fluid flow in line 354 and maintain the predetermined pressure therein.

In operation, foot applied input force on pedal 332 in the direction of arrow 361 causes pivotal displacement of pedal arm 334 in the direction of arrow 340. Support arm 342, cylinder 346, rod 348, and cam follower roller 350 are pivotally displaced in the direction of arrow 344. When roller 350 is moved beyond lever arm pivot 304, the lever arm is progressively pivoted in the direction of arrow 362 and the force applied to piston rod 348 in cylinder 346 is transferred to lever arm 300 through roller 350 and cam surface 352 which, if arcuate causes the resistance to pedal force and actuating force applied by cylinder 346 on lever arm 300 to remain substantially constant. The magnitude of the force applied by the lever arm 300 to the brake actuating rod 310 is changed in proportion to the radial variation in location of roller 350 along cam surface 352 beyond pivot 304.

The force applied through lever arm 300 is transferred through clevis member 314 to collar member 320 and ratchet member 324 and from collar member 320 to collar member 318 and ratchet member 322 through the compression spring 326 therebetween.

The actuating force is transferred from ratchet members 322, 324 to rod member 310 through teeth 312 thereon. At such time as there may be wear of the parts, collar 318 engages a stop 328 which holds the collar 318 relative to the rod 310. At such times, the rod 310 may be moved in the direction of arrow 364 relative to collar 318 which causes an increase in force applied by the compression spring 326 to collar 320 which, upon release of the brake, results in corresponding movement of the toothed surface of rod 310 and ratchet 324 to maintain the same relationship before and after adjustment.

Figures 7, 8, 9, 10:
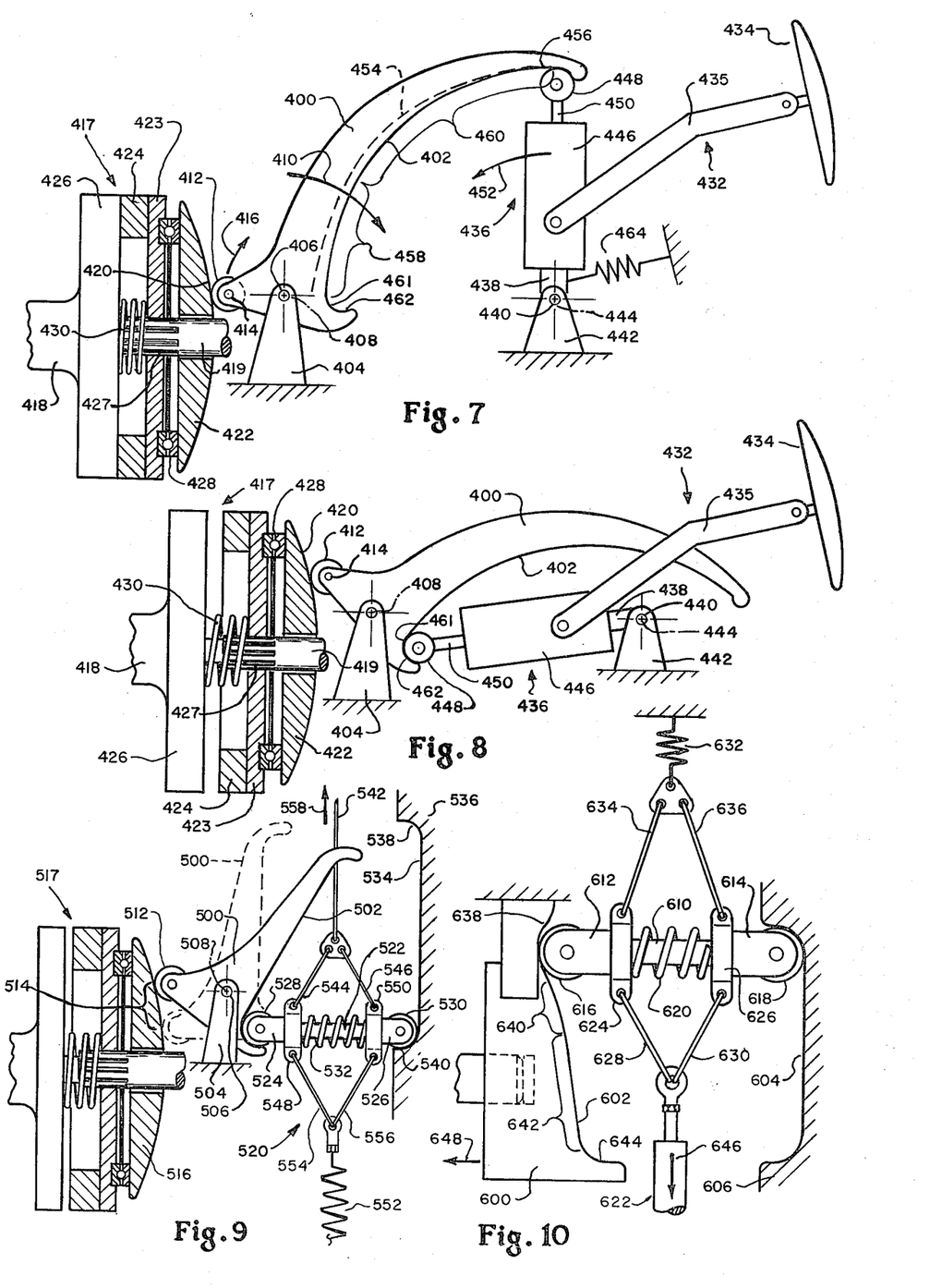
FIG. 7 is a schematic side elevational view, partly in cross-section, of a friction clutch embodiment of the invention in an engaged position.
FIG. 8 is another side elevational view of the apparatus of FIG. 7 in a disengaged position.
FIG. 9 is a schematic side elevational view, partly in cross-section, of another friction clutch embodiment of the invention.
FIG. 10 is a schematic side elevational view of a portion of another friction clutch embodiment.

In the friction clutch embodiment of FIGS. 7 & 8, a lever arm means 400 having a cam surface 402 is pivotally mounted on a fixed bracket 404 by a pivot pin 406 providing a pivotal axis 408 for pivotal movement in the direction of the arrow 410 from a clutch engaging position, FIG. 7, to a clutch disengaging position, FIG. 8. A clutch connecting means, in the form of a roller member 412 mounted on lever arm 400 by a pin 414 for movement therewith along an arc 416, operatively connects lever arm 400 to friction clutch means 417, operative to drivingly connect and disconnect rotatable shafts 418, 419 by engagement of roller member 412 with a suitable cam surface 420 operatively associated with the clutch means. In the illustrative embodiment, the clutch means comprises an axially movable non-rotatable control plate member 422 operatively associated with a rotatable clutch plate means 423 carrying friction pad means 424 which are axially movably engageable and disengageable relative to rotatable flywheel member 426 by axial movement relative to shaft 419. Clutch plate means 423 is drivably connected to shaft 419 by splined connecting means 427. Suitable thrust bearing means 428 are provided to enable rotation of the clutch plate 423 and pad means 424 with the flywheel means 426 relative to the control plate 422. Suitable retracting spring means 430 are provided to axially displace the clutch plate 423 and pad means 424 and control plate 420 from the engaged driving position to a disengaged non-driving position relative to the flywheel means 426.

A clutch actuating means 432 comprises a foot operable pedal 434 and lever arm 435 suitably operably connected to a pivotally displaceable substantially constant force applying means 436 comprising an arm member 438 pivoted on a pin 440 mounted in a fixed bracket 442 to provide a pivotal axis 444 and a power cylinder 446 mounted on arm 438 with a cam follower roller 448 on piston rod 450 continuously engaging cam surface 402, such as disclosed in the embodiment of FIG. 6, or a compression spring arrangement of the embodiment of FIG. 5.

In operation, with the clutch engaged as shown in FIG. 7, relatively low force input applied to pedal 434 against relatively low resistance causes pivotal displacement of arm 438 and power cylinder 446 and roller 448 in the direction of arrow 452. Roller 448 moves radially inwardly along cam surface 402 to gradually decrease the amount of force transferred through arm 402 to clutch control plate 422. The cam surface 402 may be arcuate as previously described or preferably has a non-arcuate contour which gradually radially outwardly increases in slope so as to gradually merge with an imaginary arc 454 at 456. The curvative of surface 402 is such as to provide gradual engagement and disengagement of the clutch including a minimum applied force slip range 458 and a maximum applied force fully engaged range 460 in which applied force is gradually increased. Thus, during disengagement, the roller 448 moves through the fully engaged range 460 and then through the slip range 458 until reaching an O force applying position opposite pivotal axis 408 whereafter the clutch pads 424 are completely disengaged from the flywheel 426 by rapid displacement as roller 448 moves along the overcenter cam surface portion 461 to stop surface 462. Due to the increased deviation of surface 402 away from arc 454, the resistance to movement of roller 448 gradually increases to provide "feel" on the pedal.

During engagement of the clutch upon removal of input force on pedal 434, a suitable return spring means illustrated at 464 suitably associated with control arm 438 or pedal arm 435 causes initial overcenter movement of roller 448 relative to arm axis 408 resulting in immediate initial slip engagement of pads 424 with flywheel means 426. As the roller moves radially outwardly along surface 402, the force applied to the pads is gradually increased through the slip range 458 until full non-slip engagement is obtained in the non-slip range 460 with full maximum force application obtained at the stop position 456. The contour of surface 402 is such as to gradually reduce resistance to movement of roller 448 and gradually increase the rate of movement thereof so as to smoothly but relatively slowly reach the fully engaged range 460 and thereafter more rapidly reach the full force application position 456.

In the friction clutch embodiment of FIG. 9, a lever arm means 500 having a cam surface 502 is pivotally mounted on a fixed bracket 504 by a pivot pin 506 providing a pivotal axis 508 for pivotal movement between a clutch disengage position as shown and an engaged clutch position. A roller member 512 is mounted on lever arm 500 and operatively engageable with a cam surface 514 on a control plate 516 of friction clutch means 517 as previously described with reference to FIGS. 7 and 8.

A modified lever actuating means 520 comprises a rod member 522 having clevis members 524, 526 mounted on opposite ends thereof and supporting cam follower roller members 528, 530. At least one clevis member is axially slidably mounted relative to rod 522 and prestored force means in the from of a compression spring 532 is compressibly mounted between the clevis members. Rod member 522 is linearly movable up and down track surface 534 in a fixed plate member 536 between stop surfaces 538, 540. Rod member 522 is actuated by externally applied relatively low force by a cable 542 connected to rod 522 by suitable connecting means such as wire members 544, 546 connected to bracket members 548, 550 attached to the clevis members. A return spring means 552 is connected to rod 522 by suitable connecting means in the form of wire members 554, 556 connected to bracket members 548, 550.

In operation of the embodiment of FIG. 9, application of force on cable means 542 in the direction of arrow 558 causes upward movement of rod 522 with roller 528 engaging cam surface 502 to pivotally displace the lever arm 500 to the clutch engaging position illustrated in phantom as previously described by reference to FIGS. 7 and 8. Application of force to rod 522 in the opposite direction causes pivotal movement of lever arm 500 to the disengaged position as previously described. Compression spring 532 continuously applies a predetermined substantially constant force on the lever arm which is increased or decreased by the lever arm in accordance with the radial location of application of the spring force on the lever arm.

In the embodiment of FIG. 10, an axially displaceable clutch plate member 600 is provided with a cam surface 602 opposite a cam track surface 604 in a fixed member 606. A rod member 610 has clevis members 612, 614 carrying roller members 616, 618 mounted on opposite ends thereof. A compression spring 620 of predetermined spring force is compressibly mounted between the clevis members, at least one of which is axially slidably mounted on the rod, to provide a predetermined force applied to surface 602 through roller 616. Suitable external force applying means, in the form of a cable or rod 622 connected to bracket members 624, 626 on rod 610 by wire members 628, 630 is provided to move the rod up and down the surfaces 602, 604 to cause axial displacement of member 600. A return spring means 632 is connected to bracket members 624, 626 by wire members 634, 636. A fixed abutment surface 638 is provided at the upper end of surface 602.

In operation of the embodiment of FIG. 10, the surface 602 is contoured to provide a slip range 640 and a fully engaged range 642 whereat maximum force is applied upon reaching stop surface 644. Surface 638 provides a stop surface whereat clutch member 600 is fully axially displaced. When an external actuating force is applied on member 622 in the direction of arrow 646, the rod is moved downwardly along track surface 604. Roller 616 exerts a force on surface 602 equal to the force provided by precompressed spring 620 which causes axial displacement of clutch member 600 in the direction of arrow 648. When the external force is removed from member 622, the rod 610 is returned to the initial position with roller 616 located on fixed surface 638.

While the inventive concepts have been shown in connection with a particular caliper brake type bicycle brake system, particular type automotive brake systems, and particular type clutch systems, it is to be understood that the inventive concepts are applicable to other types of caliper brake type bicycle brake systems, to disc type bicycle brake systems to other types of automotive brake and clutch systems, and to other types of behicular and machinery brake and clutch systems. Thus, it is intended that the appended claims be construed to include various alternative embodiments of the inventive concepts except insofar as limited by the prior art.

What is claimed is:

1. A brake system for applying braking force to retard the movement of a bicycle wheel or the like comprising:

a pair of lever arm means for holding brake pad means for movement between an open non-braking position and a closed braking position relative to the bicycle wheel and for applying braking force thereto in the closed braking position;

pivotal connecting means for providing a central pivotal axis and connecting said lever arm means and enabling pivotal movement thereof between the open non-braking position and the closed braking position and in the closed braking position between a minimum braking force application position and a maximum braking force application position;

force reaction cam surface means on one of said lever arm means for applying actuating force and for causing pivotal movement of said lever arm means between the various positions;

movable actuating means operably connected to said lever arm means and being movable relative thereto for applying brake actuating force to said surface means and for causing pivotal movement of said lever arm means between the minimum braking force application position and the maximum braking force application position and various selectively controlled force application positions therebetween in response to externally applied force;

spring means operably associated with said movable actuating means for applying spring generated force of substantially constant magnitude to said lever arm means independently of the externally applied force at each of the various selectively controlled force application positions along said surface means and being effective in each position to cause selectively controlled application of braking force to the bicycle wheel through said lever arm means proportional to the applied spring force and the position of said movable actuating means while enabling return of said lever arm means toward the minimum braking force application position in response to reduction of the externally applied force and return of said lever arm means to the non-braking position upon removal of the externally applied force; and control means connected to said movable actuating means for applying the externally applied force thereto and for causing movement of said movable actuating means relative to said lever arm means resulting in pivotal movement of said lever arm means between the various positions and for changing the location of the place of application of the spring force to the lever arm means relative to the central pivotal axis of said lever arm means.

2. The invention as defined in claim 1 and wherein said surface means and said movable actuating means and said spring means being constructed and arranged to provide a predetermined spring force during movement of said lever arm means in the closed braking position.

3. The invention as defined in claim 2 and further comprising:
first stop means operatively associated with said movable actuating means for preventing movement thereof beyond a predetermined maximum braking force application position thereby limiting the applicable maximum braking force within predetermined safety limits.

4. The invention as defined in claim 3 and wherein said surface means and said movable actuating means being further constructed and arranged for holding the lever arm means in the open non-braking position until positively moved from the open non-braking position to the closed braking position by external force in excess of the effective spring force.

5. The invention as defined in claim 1, 2, 3 or 4 and wherein: said movable actuating means comprising:
a rod member having a central longitudinal axis;
rod connecting means for slidably and pivotally connecting one end of said rod member relative to the other of said lever arm means and for providing a pivotal axis extending parallel to and radially spaced from the central axis of said lever arm means;
a roller means mounted on the other end of said rod member and having a rotational axis parallel to and radially spaced from the central pivotal axis of said lever arm means and the pivotal axis of said rod member for continuous engagement with said surface means on the one of said lever arm means; and
said spring means comprising a compression spring member operatively associated with said rod member and said roller means and biasing said roller means into continuous spring force transfer engagement with said surface means.

6. The invention as defined in claim 5 and wherein said rod member and said roller means and said rod connecting means being constructed and arranged to provide a pivotally movable spring force application plane including the central longitudinal axis of said rod member and the pivotal axis for said rod member and the rotational axis of said roller means.

7. The invention as defined in claim 6 and said rod member and said roller means and said rod connecting means and said surface means being further constructed and arranged to enable said spring force application plane to be located on opposite sides of a central plane including said central pivotal axis of said lever arm means and said pivot axis of said rod member whereby said spring member is effective to exert a spring force on one side of said center plane effective to bias said lever arm means toward the open non-braking position and is effective to exert a spring force on the other side of said center plane to bias said lever arm means toward the closed braking position.

8. The invention as defined in claim 7 and wherein said control means comprising:
an actuating wire member operatively connected to said rod member and said roller means to pivotally displace said rod member and move said roller means along said surface means.

9. A brake system for retarding movement of the wheel of a vehicle or the like comprising:
first and second arm means having brake pad means mounted thereon for frictional retarding engagement with the movable member and being constructed and arranged for movement between an open non-braking position and a closed braking position and in the closed position between an initial minimum brake force applying position and a maximum brake force applying position;
pivotal connecting means providing a pivotal axis for said arm means for enabling pivotal movement of said arm means between the open non-braking position and the closed braking position and various selectively controlled force application positions therebetween;
actuator means for causing pivotal movement of said arm means between the various positions in response to externally applied actuating forces;
control means for applying external actuating force to said actuator means;
spring means operatively associated with said actuator means and said arm means for continuously applying a braking force on said arm means independent of the external actuating force between the initial minimum brake force applying position and the maximum brake force applying position and for exerting at least a predetermined minimum force on and sufficient to maintain said arm means in the open non-braking position until application of a predetermined minimum applied actuating force while enabling return of said arm means toward the initial minimum braking force application position in response to reduction of the externally applied force and return of said arm means to the non-braking position upon removal of the externally applied force and for immediately moving said arm means from the open non-braking position to the closed braking position after a predetermined minimum initial movement of said arm means from the open non-braking position toward the closed braking position caused by application of a predetermined minimum applied actuating force to said actuator means; and
cam means operatively associated with said spring means and said arm means for increasing the minimum braking force applied by said arm means in the closed braking position in proportion to the spring force applied by said spring means and the amount of movement of arm means from the initial minimum brake force applying position to the maximum brake force applying position.

10. The invention as defined in claim 9 and further comprising:
braking force limiting means for limiting the maximum braking force applicable through said arm means regardless of the amount of actuating force applied thereto.

11. The invention as defined in claim 9 or 10 and wherein:
a portion of said cam means being operative to increase the force applied by said spring means to said arm means during movement from said closed initial minimum braking force position to said closed maximum braking force position.

* * * * *